United States Patent
Howard (10) Patent No.: US 12,404,835 B1
(45) Date of Patent: Sep. 2, 2025

(54) SYSTEM AND METHOD FOR REDUCING DRIVETRAIN COUPLING TORQUES AFTER A GRID EVENT

(71) Applicant: GE Infrastructure Technology LLC, Greenville, SC (US)

(72) Inventor: Dustin F. Howard, Brookhaven, GA (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/635,119

(22) Filed: Apr. 15, 2024

(51) Int. Cl.
*F03D 9/00* (2016.01)
*F03D 9/11* (2016.01)
*F03D 9/25* (2016.01)
*H02J 3/00* (2006.01)
*H02J 3/28* (2006.01)

(52) U.S. Cl.
CPC ............... *F03D 9/255* (2017.02); *F03D 9/11* (2016.05); *H02J 3/001* (2020.01); *H02J 3/28* (2013.01); *F05B 2220/706* (2013.01); *F05B 2270/1033* (2013.01); *F05B 2270/337* (2013.01)

(58) Field of Classification Search
CPC ..................................................... F03D 9/255
See application file for complete search history.

(56) References Cited

U.S. PATENT DOCUMENTS

| | | |
|---|---|---|
| 5,798,633 A | 8/1998 | Larsen et al. |
| 7,119,452 B2 | 10/2006 | Larsen |
| 7,456,695 B2 | 11/2008 | Weng et al. |
| 7,804,184 B2 | 9/2010 | Yuan et al. |
| 8,046,109 B2 | 10/2011 | Larsen et al. |
| 8,067,845 B2 | 11/2011 | Thulke et al. |
| 8,093,742 B2 | 1/2012 | Gupta et al. |

(Continued)

FOREIGN PATENT DOCUMENTS

| | | |
|---|---|---|
| CN | 109494709 A | 3/2019 |
| EP | 2270331 A2 | 1/2011 |

(Continued)

OTHER PUBLICATIONS

Miller et al., Design and commissioning of a 5 MVA, 2.5 MWh battery energy storage system, Proceedings of 1996 Transmission and Distribution Conference and Exposition, Los Angeles CA, 1996, pp. 339-345. doi: 10.1109/TDC.1996.545957.

*Primary Examiner* — Adi Amrany
(74) *Attorney, Agent, or Firm* — Dority & Manning, P.A.

(57) ABSTRACT

A method for controlling a power generating asset connected to an electrical grid includes receiving a grid power limit associated with a grid event and, based on the grid power limit, determining a target grid power for the generator during recovery from the grid event. During the recovery, a first power softening function is implemented that includes receiving at least one of a torsional angle signal or change in speed signal associated with the drivetrain. Upon the torsional angle or change in speed crossing a threshold value, the method decrease a power command on the generator below the target grid power to reduce the torsional angle at a later point in time. A power difference between the target grid power and the decreased power command of the generator is determined and power is supplied from an energy storage device in communication with the converter to make up the power difference.

20 Claims, 8 Drawing Sheets

(56) References Cited

U.S. PATENT DOCUMENTS

| | | | |
|---|---|---|---|
| 8,120,932 | B2 | 2/2012 | Folts et al. |
| 8,742,609 | B2 | 6/2014 | Helle et al. |
| 9,270,194 | B2 | 2/2016 | Brogan et al. |
| 9,467,082 | B2 | 10/2016 | Garcia |
| 9,590,549 | B2 | 3/2017 | Damen |
| 9,660,452 | B2 | 5/2017 | Routimo |
| 9,660,453 | B2 | 5/2017 | Majumder |
| 9,859,828 | B2 * | 1/2018 | Tarnowski ............... H02J 3/28 |
| 10,113,533 | B2 | 10/2018 | Menke |
| 10,156,225 | B2 | 12/2018 | Huang et al. |
| 10,677,218 | B2 | 6/2020 | Kjaer et al. |
| 11,401,918 | B2 | 8/2022 | Kavil Kambrath et al. |
| 11,448,188 | B2 | 9/2022 | Sanchez Navarro et al. |
| 11,870,386 | B2 | 1/2024 | Howard et al. |
| 2009/0200803 | A1 | 8/2009 | Ichinose et al. |
| 2009/0206606 | A1 | 8/2009 | Jorgensen et al. |
| 2009/0278351 | A1 | 11/2009 | Rivas et al. |
| 2010/0142237 | A1 | 6/2010 | Yuan et al. |
| 2012/0104754 | A1 * | 5/2012 | Rudolf .................. H01H 9/547 290/44 |
| 2015/0008672 | A1 | 1/2015 | Garcia |
| 2016/0285252 | A1 | 9/2016 | Burra et al. |
| 2021/0010456 | A1 | 1/2021 | Sanchez Navarro et al. |
| 2021/0281070 | A1 | 9/2021 | Gupta et al. |
| 2022/0077797 | A1 | 3/2022 | Achilles et al. |
| 2023/0122027 | A1 | 4/2023 | Howard et al. |

FOREIGN PATENT DOCUMENTS

| | | |
|---|---|---|
| EP | 2360375 A2 | 8/2011 |
| EP | 2523298 A1 | 11/2012 |
| EP | 3764503 A1 | 1/2021 |
| EP | 4009468 A1 | 6/2022 |
| WO | WO2012/134458 A1 | 10/2012 |
| WO | WO2015/131958 A1 | 9/2015 |
| WO | WO2022/122100 A1 | 6/2022 |

* cited by examiner

SYSTEM AND METHOD FOR REDUCING DRIVETRAIN COUPLING TORQUES AFTER A GRID EVENT

FIELD

The present disclosure relates in general to power generation, and more particularly to systems and methods for reducing coupling torques in the drivetrain of a wind turbine power system after a grid event.

BACKGROUND

Power generating assets may take a variety of forms and rely on renewable and/or nonrenewable sources of energy. Those power generating assets relying on renewable sources of energy may generally be considered one of the cleanest, most environmentally friendly energy sources presently available. For example, wind turbines have gained increased attention in this regard. A modern wind turbine typically includes a tower, a generator, a gearbox, a nacelle, and one or more rotor blades. The nacelle includes a rotor coupled to the gearbox and to the generator. The rotor and the gearbox are mounted on a bedplate support frame located within the nacelle. The rotor blades capture kinetic energy of wind using known airfoil principles. The rotor blades transmit the kinetic energy in the form of rotational energy so as to turn a shaft coupling the rotor blades to the gearbox, or if the gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple wind turbine generators that are operable to supply power to a transmission system providing power to an electrical grid.

Wind turbines can be distinguished in two types: fixed speed and variable speed turbines. Conventionally, variable speed wind turbines are controlled as current sources connected to an electrical grid. In other words, the variable speed wind turbines rely on a grid frequency detected by a phase locked loop (PLL) as a reference and inject a specified amount of current into the grid. The conventional current source control of the wind turbines is based on the assumptions that the grid voltage waveforms are fundamental voltage waveforms with fixed frequency and magnitude and that the penetration of wind power into the grid is low enough so as to not cause disturbances to the grid voltage magnitude and frequency. Thus, the wind turbines simply inject the specified current into the grid based on the fundamental voltage waveforms.

Grid faults, such as low-voltage ride through (LVRT) and/or zero-voltage ride through (ZVRT) events, produce large transient torques in the mechanical drive train of the wind turbine power system. These torque events can reach large magnitudes that can damage the gearbox. Accordingly, existing drivetrain designs for wind turbine power systems typically rely on a slip coupling for protection of the gearbox. However, the slip coupling can wear out quickly and can be expensive to replace.

Various damping control systems are known and used to decrease the excessive drivetrain coupling torques, including increasing the gain/limits of the damping controllers during and after a grid event. This approach, however, combined with the natural oscillation frequency of the drivetrain, can introduce large power oscillations into the grid that violate strict grid requirements.

In view of the foregoing, the art is continuously seeking new and improved systems and methods for reducing the coupling torques between components in the drivetrain of the wind turbine power system during and after a grid event while maintaining compliance with grid power requirements.

BRIEF DESCRIPTION

Aspects and advantages of the invention will be set forth in part in the following description, or may be obvious from the description, or may be learned through practice of the invention.

In an aspect, the present disclosure is directed to a method for controlling a power generating asset connected to an electrical grid. The power generating asset has a power converter and a drivetrain with a generator. The method includes: receiving, via a controller, a grid power limit associated with a grid event occurring in the electrical grid; based on the grid power limit, determining a target grid power for the generator during recovery from the grid event; during the recovery from the grid event, implementing, via the controller, a first power softening function, the first power softening function comprising: receiving at least one of a torsional angle signal or change in speed signal associated with the drivetrain; upon at least one of the torsional angle or change in speed crossing a threshold value, decreasing a power command on the generator below the target grid power to reduce the torsional angle at a later point in time; determining a power difference between the target grid power and the decreased power command of the generator; and supplying power from an energy storage device in communication with the converter to make up the power difference.

The threshold value may reflect a torsional angle indicative of a torque reversal between two or more components on the drivetrain. In this embodiment, the power command on the generator may be decreased in proportion to a rate of change of the torsional angle following the torque reversal, and wherein the power supplied from the energy storage device is increased based on the difference between the target grid power and the reduced power command on the generator so that the total power injected into the grid follows the target grid power.

In another embodiment, the threshold value may reflect a change in speed indicative of a decreasing speed associated with the drivetrain. In this embodiment, the power command on the generator may be temporarily frozen or increased at a slower rate than the target grid power following the indication of a decreasing speed associated with the drivetrain.

An embodiment may include increasing the power command on the generator toward the target grid power when a phase of the torsional angle is decreasing or the speed is increasing during recovery from the grid event.

Still other embodiments may include implementing, via the controller, a second power softening function during the grid event but before the recovery from grid event, the second power softening function comprising: increasing the power command on the generator to above the target grid power during the grid event; and diverting excess power generated by the generator above the target grid power requirement to the energy storage device. In this embodiment, once the energy storage device is charged or a charging rate limit on the energy storage device is reached, the excess power generated by the generator may be dissipated via a dynamic brake in the power converter.

The grid power limit may be computed as a function of at least one of a voltage feedback or a phase locked loop (PLL) error signal.

The power generating asset may be a wind turbine.

The energy storage device may be one or both of a battery or an ultracapacitor.

In certain embodiments of the method, the grid event may include one of a low-voltage ride through event (LVRT) or a zero-voltage ride through (ZVRT) event.

The present disclosure also encompasses a power generating asset connected to an electrical grid, the power generating asset including: a generator; a power converter coupled to the generator; and a controller with at least one processor configured to perform a plurality of operations, which may include: receiving a grid power limit associated with a grid event occurring in the electrical grid; based on the grid power limit, determining a target grid power for the generator during recovery from the grid event; during the grid event, implementing a first power softening function. The first power softening function may include: receiving at least one of a torsional angle signal or change in speed signal associated with the drivetrain; upon at least one of the torsional angle or change in speed crossing a threshold value, decreasing a power command on the generator below the target grid power to reduce the torsional angle at a later point in time; determining a power difference between the target grid power and the decreased power command of the generator; and supplying power from an energy storage device in communication with the converter to make up the power difference.

The controller may be further configured to perform any combination of the functions discussed above with respect to the various method embodiments.

The power generating asset may be a wind turbine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Grid events, such as low-voltage ride through (LVRT) and/or zero-voltage ride through (ZVRT) events, produce large transient torques in the mechanical drive train of a wind turbine power system that can damage the gearbox. Accordingly, existing drivetrain designs for wind turbine power systems typically rely on a slip coupling to meet LVRT/ZVRT requirements. In particular, the slip coupling may be installed for protection of the gearbox. However, the slip coupling can wear out quickly and can be expensive to replace.

Accordingly, the present disclosure is directed to systems and methods for controlling a power generating asset, such as a wind turbine, connected to an electrical grid such that the detrimental transient torques in the mechanical drive drain are reduced by decreasing the power demand on the generator upon the torque angle between the electrical torque generated by the generator and the mechanical torque exceed a threshold value. Any deficit between the reduced power demand on the generator and a target grid power requirement for the generator during recovery from the event is made up by an energy storage device in communication with a power converter configured with the power generating asset.

Figure 1:
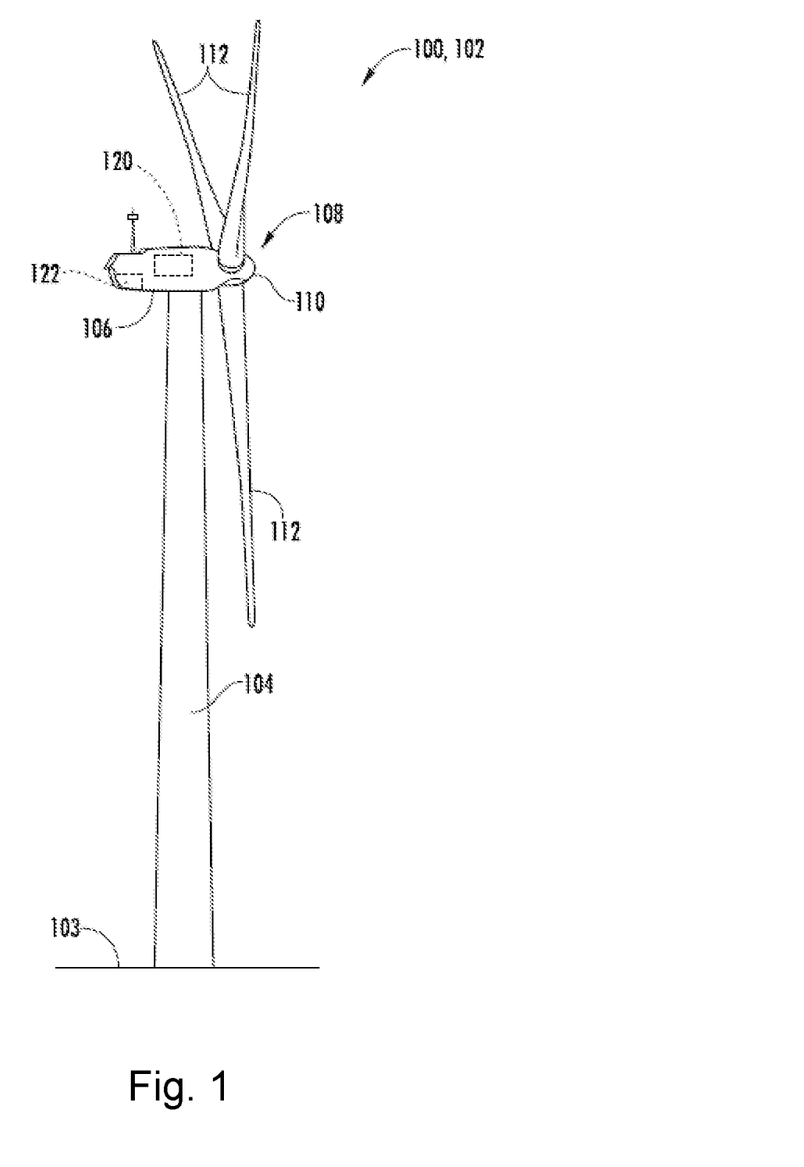
FIG. 1 is a perspective view of an embodiment of a power generating asset configured as a wind turbine power system according to the present disclosure.

Referring now to the drawings, FIG. 1 is a perspective view of one embodiment of a power generating asset 100 according to the present disclosure. As shown, the power generating asset 100 may be configured as a wind turbine 102. In an additional embodiment, the power generating asset 100 may, for example, be configured as a hydroelectric plant, a fossil fuel generator, and/or a hybrid power generating asset.

When configured as a wind turbine 102, the power generating asset 100 may generally include a tower 104 extending from a support surface 103, a nacelle 106 mounted on the tower 104, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) of an electrical system 200 (FIG. 2) positioned within the nacelle 106 to permit electrical energy to be produced.

The wind turbine 102 may also include a controller 120 centralized within the nacelle 106. However, in other embodiments, the controller 120 may be located within any other component of the wind turbine 102 or at a location outside the wind turbine 102. Further, the controller 120 may be communicatively coupled to any number of the components of the wind turbine 102 in order to control the components. As such, the controller 120 may include a computer or other suitable processing unit. Thus, in several embodiments, the controller 120 may include suitable computer-readable instructions that, when implemented, configure the controller 120 to perform various different functions, such as receiving, transmitting and/or executing wind turbine control signals.

Furthermore, as depicted in FIG. 1, in an embodiment, the power generating asset 100 may include at least one operational sensor 122. The operational sensor(s) 122 may be configured to detect a performance of the power generating asset 100, e.g., in response to the environmental condition. In an embodiment, the operational sensor(s) 122 may be configured to monitor a plurality of electrical conditions, such as slip, stator voltage and current, rotor voltage and current, line-side voltage and current, DC-link charge and/or any other electrical condition of the power generating asset 100.

It should also be appreciated that, as used herein, the term "monitor" and variations thereof indicates that the various sensors of the power generating asset 100 may be configured to provide a direct measurement of the parameters being monitored or an indirect measurement of such parameters. Thus, the sensor(s) 122 described herein may, for example, be used to generate signals relating to the parameter being monitored, which can then be utilized by the controller 120 to determine a condition or response of the power generating asset 100.

Figure 2:
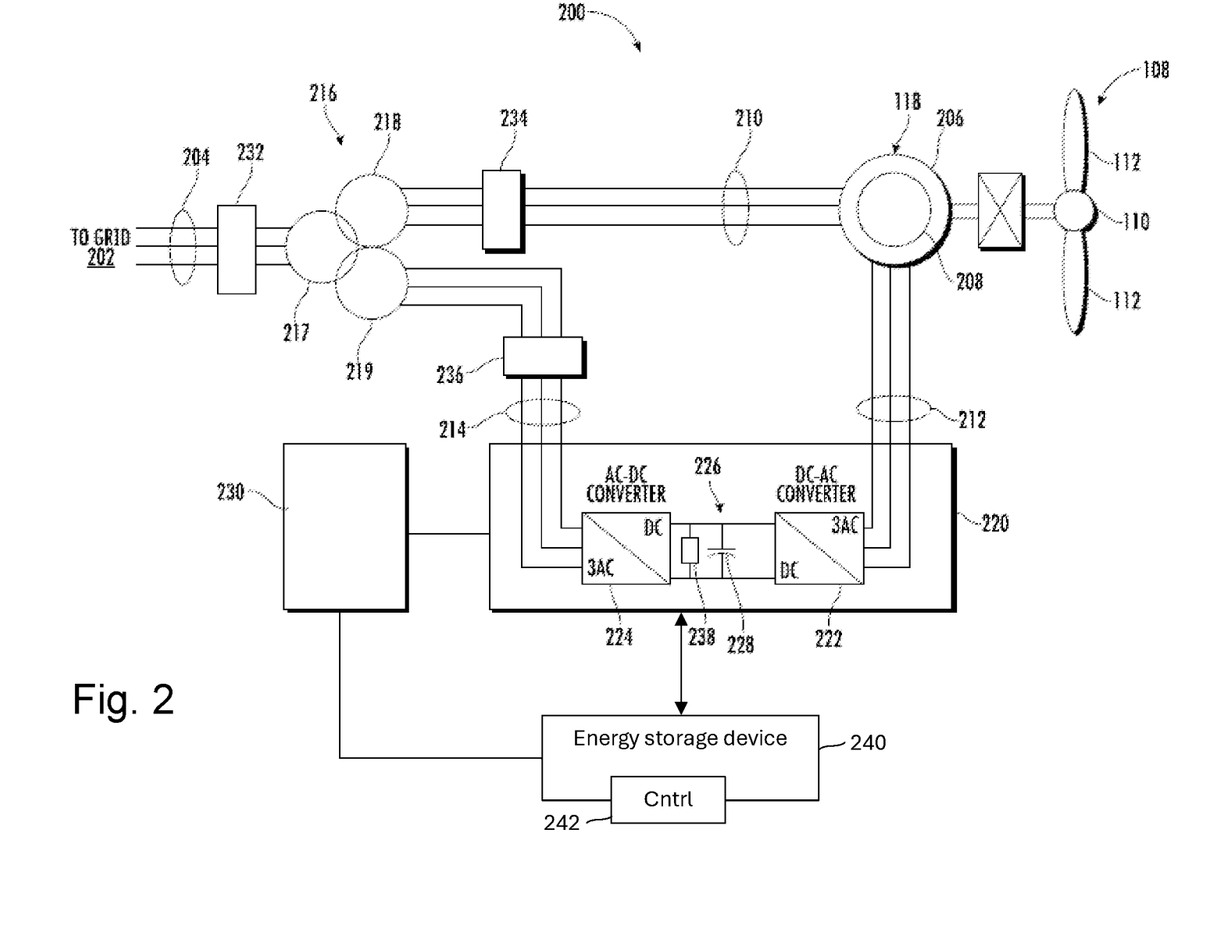
FIG. 2 is a schematic diagram of an embodiment of an electrical system for use with a power generating asset configured as a wind turbine power system according to the present disclosure.

Referring now to FIG. 2, wherein an exemplary electrical system 200 of the power generating asset 100 is illustrated. As shown, the generator 118 may be coupled to the rotor 108 for producing electrical power from the rotational energy generated by the rotor 108. Accordingly, in an embodiment, the electrical system 200 may include various components for converting the kinetic energy of the rotor 108 into an electrical output in an acceptable form to an electrical grid 202 via grid bus 204. For example, in an embodiment, the generator 118 may be a double-fed induction generator (DFIG) having a stator 206 and a generator rotor 208. The generator 118 may be coupled to a stator bus 210 and a power converter 220 via a rotor bus 212. In such a configuration, the stator bus 210 may provide an output multiphase power (e.g., three-phase power) from a stator of the generator 118, and the rotor bus 212 may provide an output multiphase power (e.g., three-phase power) of the generator rotor 208 of the generator 118. Additionally, the generator 118 may be coupled via the rotor bus 212 to a rotor side converter 222. The rotor side converter 222 may be coupled to a line-side converter 224 which, in turn, may be coupled to a line-side bus 214.

In an embodiment, the rotor side converter 222 and the line-side converter 224 may be configured for normal operating mode in a three-phase, pulse width modulation (PWM) arrangement using insulated gate bipolar transistors (IGBTs) Other suitable switching devices may be used, such as insulated gate commuted thyristors, MOSFETs, bipolar transistors, silicone-controlled rectifiers, and/or other suitable switching devices. Furthermore, as shown, the rotor side converter 222 and the line-side converter 224 may be coupled via a DC link 226 across a DC link capacitor 228. In addition, as shown, the power converter 220 may include an energy buffer, such as a dynamic brake 238.

In an embodiment, the power converter 220 may be coupled to the controller 120 configured as a converter controller 230 to control the operation of the power converter 220. For example, the converter controller 202 may send control commands to the rotor side converter 222 and the line-side converter 224 to control the modulation of switching elements used in the power converter 220 to establish a desired generator torque setpoint and/or power output.

As further depicted in FIG. 2, the electrical system 200 may include a transformer 216 coupling the power generating asset of 100 to the electrical grid 202. The transformer 216 may, in an embodiment, be a three-winding transformer which includes a high voltage (e.g., greater than 12 KVAC) primary winding 217. The high voltage primary winding 217 may be coupled to the electrical grid 179. The transformer 216 may also include a medium voltage (e.g., 6 KVAC) secondary winding 218 coupled to the stator bus 210 and a low voltage (e.g., 575 VAC, 690 VAC, etc.) auxiliary winding 219 coupled to the line bus 214. It should be appreciated that the transformer 216 can be a three-winding transformer as depicted, or alternatively, may be a two-winding transformer having only the primary winding 217 and the secondary winding 218; may be a four-winding transformer having the primary winding 217, the secondary winding 218, the auxiliary winding 219, and an additional auxiliary winding; or may have any other suitable number of windings.

The electrical system 200 may include various protective features (e.g., circuit breakers, fuses, contactors, and other devices) to control and/or protect the various components of the electrical system 200. For example, the electrical system 200 may, in an embodiment, include a grid circuit breaker 232, a stator bus circuit breaker 234, and/or a line bus circuit breaker 236. The circuit breaker(s) 232, 234, 236 of the electrical system 200 may connect or disconnect corresponding components of the electrical system 200 when a condition of the electrical system 200 approaches a threshold (e.g., a current threshold and/or an operational threshold) of the electrical system 200.

Figure 3:
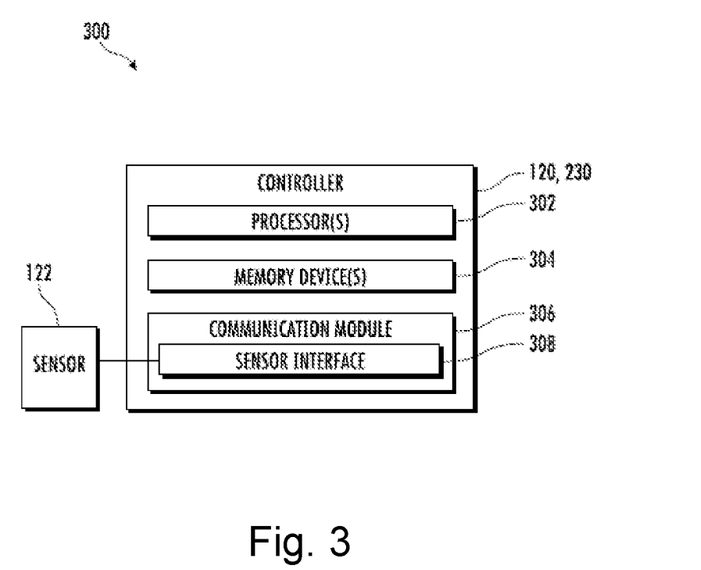
FIG. 3 is a block diagram of an embodiment of a controller for use with a power generating asset according to the present disclosure.

Referring now to FIG. 3, a block diagram of an embodiment of suitable components that may be included within a controller 300 of the power generating asset 100, such as the wind turbine 102, is illustrated. For example, as shown, the controller 300 may be the turbine controller 120 or the converter controller 230. Further, as shown, the controller 120 includes one or more processor(s) 302 and associated memory device(s) 304 configured to perform a variety of computer-implemented functions (e.g., performing the methods, steps, calculations and the like and storing relevant data as disclosed herein). Additionally, the controller 300, may also include a communications module 306 to facilitate communications between the controller 300, and the various components of the power generating asset 100. Further, the communications module 306 may include a sensor interface 308 (e.g., one or more analog-to-digital converters) to permit signals transmitted from the sensor(s) 122 to be converted into signals that can be understood and processed by the processors 302. It should be appreciated that the sensor(s) 122 may be communicatively coupled to the communications module 306 using any suitable means. For example, the sensor(s) 122 may be coupled to the sensor interface 308 via a wired connection. However, in other embodiments, the sensor(s) 122 may be coupled to the sensor interface 308 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 304 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 304 may generally be configured to store suitable computer-readable instructions that, when implemented by the processor(s) 302, configure the controller 300 to perform various functions as described herein, as well as various other suitable computer-implemented functions.

Figure 4:
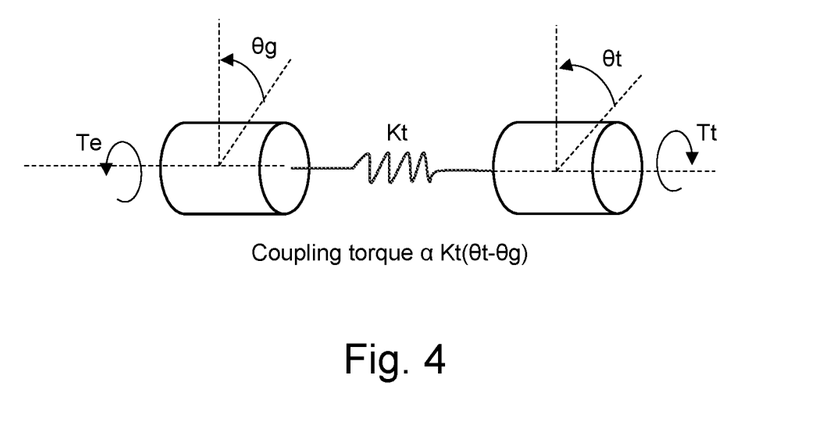
FIG. 4 is a simplified diagram depicting principles of the present disclosure.

Referring now to FIG. 4, a simplified, schematic diagram conceptually depicts the torsional angle principle of the present method as it relates to a wind turbine system. A wind turbine generator (WTG) drivetrain can be considered as a simple two mass system connected by a spring Kt, wherein the turbine, lumped together the blades and other components as a single mass, is approximated as supplying a mechanical torque Tt and the generator is approximated as supplying and electrical torque Te. When the WTG is generating power, a torsional angle between the two masses is formed and reflected as θT-θG. The coupling torque on the spring is proportional to the torsional angle. When a grid fault occurs, the two masses naturally oscillate against each other at the drivetrain natural frequency, causing oscillations in the torsional angle. For severe grid events, the electric torque reduces and the torsional angle decreases and may temporarily reverse. This event is followed by a positive peak roughly a half cycle later (which tends to coincide with highest coupling torques). Ramping the active power/torque of the generator to meet the grid requirements at the same time or leading up to the positive peak will tend to increase the torsional angle even more (possibly resulting in excessively high coupling torques).

The approach of the present method and associated system is to decrease the power/torque of the generator when the torsional angle is increasing to reduce the torsional angle peak. To meet the grid code power recovery requirements, the difference between the desired grid power recovery and the reduced drivetrain power/torque is made up by an energy storage device, such as a battery or ultracapacitor.

Figure 5:
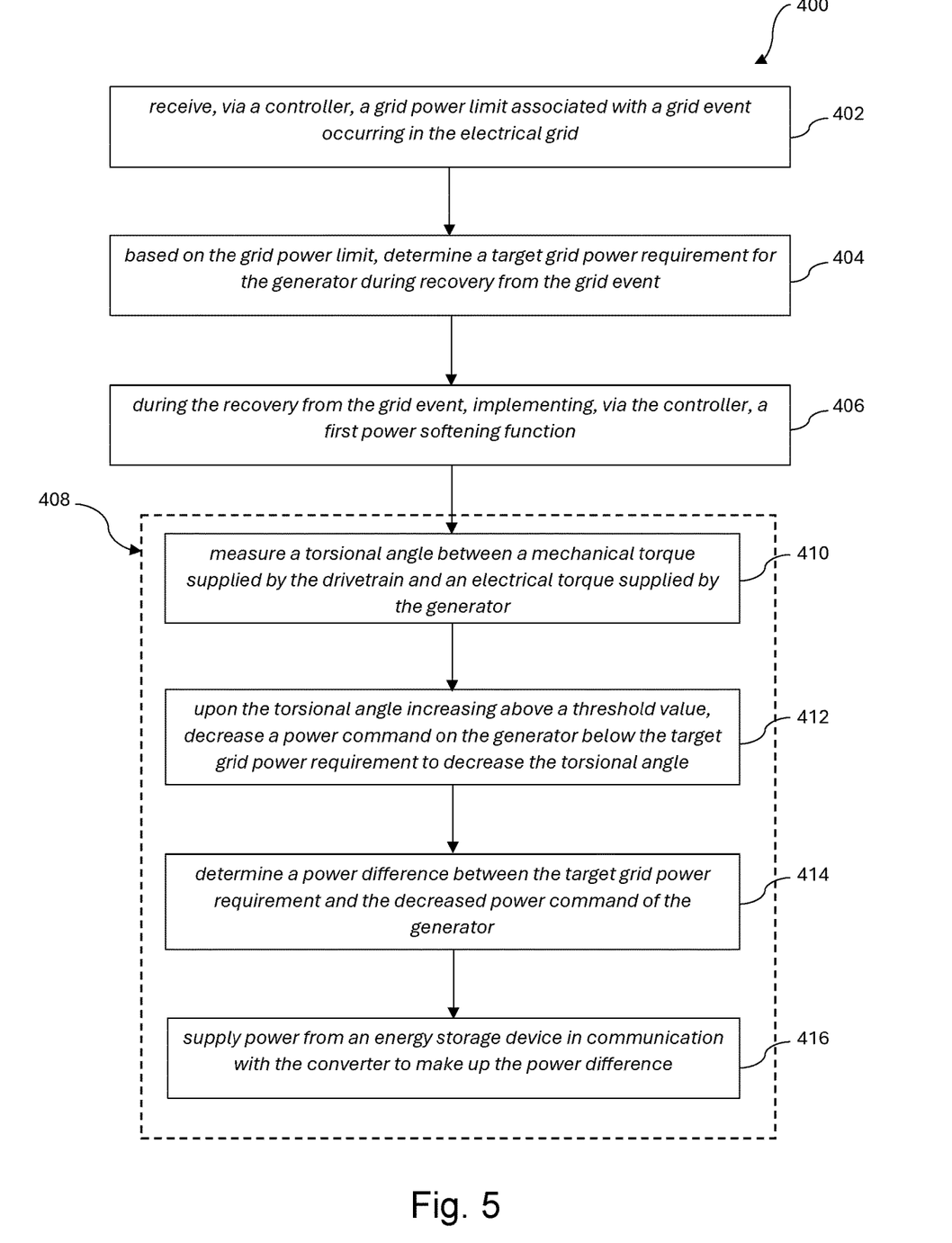
FIG. 5 is a flow diagram of one embodiment of a method for controlling a power generating asset connected to an electrical grid according to the present disclosure.

Referring now to FIG. 5, a flow diagram of one embodiment of a method 400 for controlling the power generating asset 100, particularly during a grid event, is presented. In particular embodiments, the grid event may be a low-voltage ride through event (LVRT) or a zero-voltage ride through (ZVRT) event. In further embodiments, the grid event may be any event occurring in the grid that causes large changes in generator torque/power that lead to stresses on drivetrain components. The method 400 may be implemented using, for instance, the controller 300 of the present disclosure discussed above with reference to FIGS. 2 and 3. FIG. 5 depicts steps performed in a particular order for purposes of illustration and discussion. Those of ordinary skill in the art, using the disclosures provided herein, will understand that various steps of the method 400, or any of the methods disclosed herein, may be adapted, modified, rearranged, performed simultaneously, or modified in various ways without deviating from the scope of the present disclosure.

As shown at step 402, the method 400 may include receiving, via a controller, a grid power limit associated with a grid event occurring in the electrical grid via a controller, a grid power limit (e.g., PwrLimGDPL) associated with one or more grid events occurring in the electrical grid. For example, in an embodiment depicted in FIG. 8, the method 400 may include computing the grid power limit (PwrLimGDPL) as a function of a voltage feedback, a phase locked loop (PLL) error signal, or similar.

At step 404, the method includes, based on the grid power limit, determining a target grid power requirement for the generator during recovery from the grid event. By dynamically reducing the grid active power limit during grid events, together with prioritization of voltage support, the electrical stability of the grid may be improved. However, this prioritization of grid stability can have significant impact on the drivetrain components due to the large change in power/torque associated with the grid power limit activating.

To help reduce this adverse effect on the large power/torque change on the drivetrain components, at step 406, the method 400 may include implementing, via the controller 300, a first power softening function 408 during recovery from the grid event(s). At step 410, the power softening function may include receiving a signal indication of a torsional angle between two or more components along the drivetrain (such as the turbine and the generator). This torsional angle may be measured using special sensors along the drivetrain that can detect small angular displacements between components on the drivetrain. Alternatively, this torsional angle may be estimated using a drivetrain model implemented within the controller. For example, this model may comprise the dynamic equations of a simple two mass system with associated inertia values, spring constants, and damping coefficients as parameters. The inputs to the model may include representations of the two opposing torques on the drivetrain that act to regulate speed/acceleration to estimate the torsional angle in real time.

Further, at step 412, the first power softening function 408 includes, upon the torsional angle crossing a threshold value, decreasing a power command on the generator below the target grid power requirement to decrease the torsional angle.

At step 414, the first power softening function 408 includes determining a power difference between the target grid power requirement and the decreased power command of the generator.

At step 416, the first power softening function includes supplying power from an energy storage device (e.g., a battery or ultracapacitor) in communication with the power converter to make up the power difference.

Thus, the first power softening function 408 is configured to supply the target grid power requirement while reducing the power output from the generator by supplementing the power flow to the grid with make-up power from the energy storage device. This control scheme reduces the peak in the torsional angle, thereby reducing excessive coupling torque in the drivetrain components.

Figure 6A:
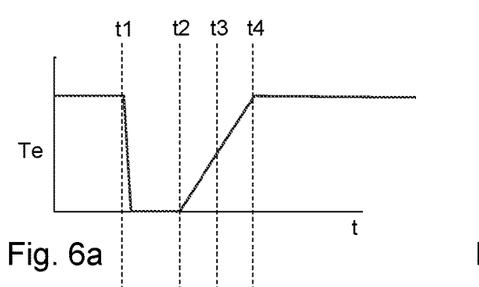
FIGS. 6a-6b are timing diagrams of electrical torque and torque angle, respectively, during a grid event.
Figure 6B:
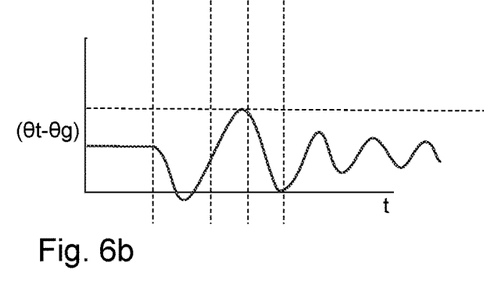

The method 400 of FIG. 5 can be better understood with reference to FIGS. 6a-6b and 7a-7c. FIG. 6a depicts the electrical torque (Te) response over time to a grid event. The electrical torque (Te) drops rapidly at the initiation of the grid event at t1. The torsional angle ($\theta t$-$\theta g$) depicted in FIG. 6b drops correspondingly with the decrease in electrical torque, and may become negative (torque reversal), as depicted in FIG. 6b. At t2, the active power/torque of the generator ramps up to a generally steady state value (e.g., the pre-grid event value) at t4. The torsional angle ($\theta t$-$\theta g$) reflects the ramp-up of the electrical toque (Te) and increases rapidly during the positive phase of the natural frequency oscillation between generator torque (Te) and mechanical torque (Tt), resulting in a peak torque angle ($\theta t$-$\theta g$) at t3. Between t3 and t4, the torsional angle decelerates due to the natural frequency oscillation. The amplitude of the natural torque angle ($\theta t$-$\theta g$) frequency decreases over time (from t4 onward) to its steady state frequency.

Figure 7A:
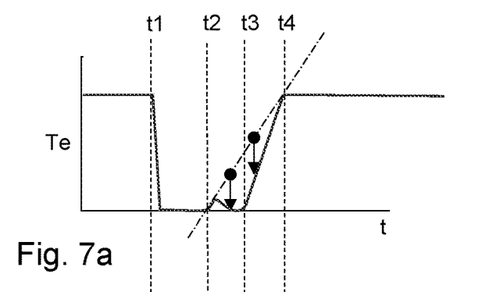
FIGS. 7a-7c are timing diagrams of electrical torque, torque angle, and power supplied by an energy storage during a grid event in accordance with aspects of the present disclosure.
Figure 7B:
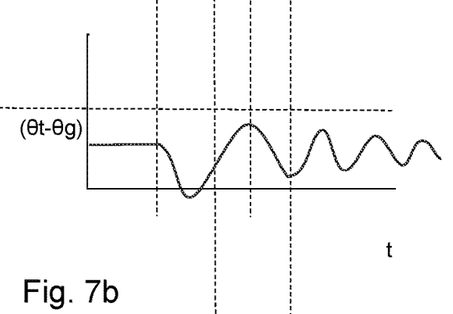

FIG. 7a depicts the electrical toque (Te) response over time to the grid event in accordance with operational aspects of the present method. The dashed slanted line depicts the increase in the electrical torque (Te) from FIG. 6a between t2-t4. The electrical torque is reduced to the solid-line profile by decreasing the active power/torque of the generator upon detection of a threshold value of the electrical torque (Te). This threshold value may be, for example, detection of the torque angle ($\theta t$-$\theta g$) reversal discussed above. By decreasing the electrical torque (Te), the peak value of the roque angle ($\theta t$-$\theta g$) at t3 is significantly reduced as compared to FIG. 6a.

Figure 7C:
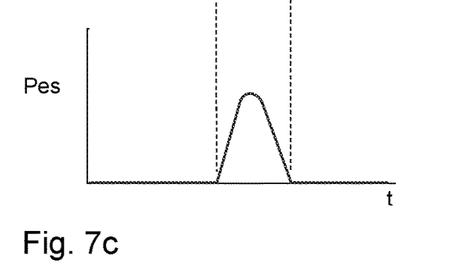

FIG. 7c depicts make-up power (Pes) from the energy storage device supplied to the power converter 220 (FIG. 2) between t2-t4 to ensure that the target grid power requirement is supplied during recovery from the grid event.

Figure 8:
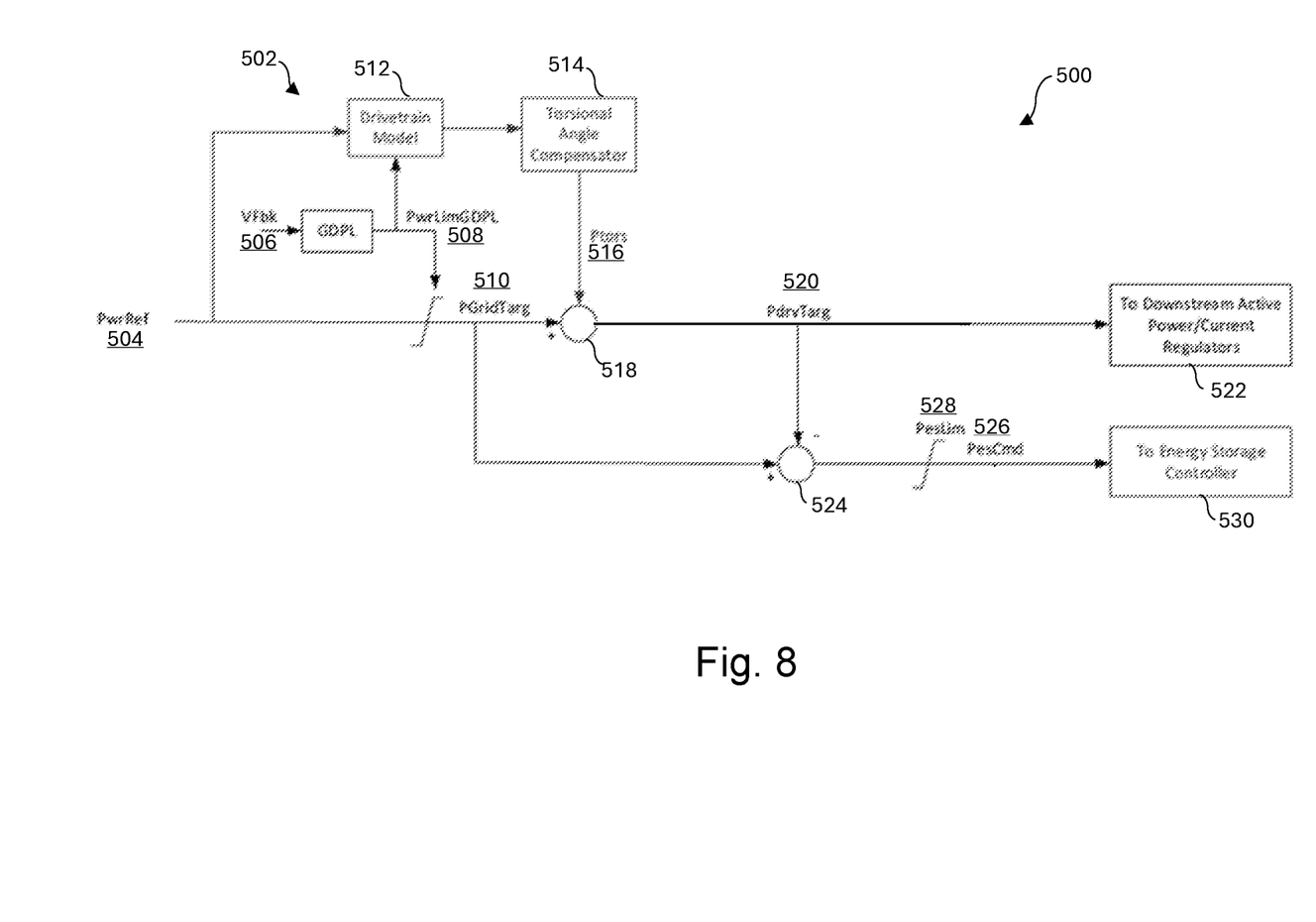
FIG. 8 is a schematic diagram of control of the power generating asset with integration of a first power softening function according to the present disclosure.

FIG. 8 is a schematic diagram of an embodiment of the method 500 with the first power softening function 502 according to the present disclosure. As shown, the power softening function 502 receives a plurality of inputs, which may include a power reference 504 (PwrRef) signal for the wind turbine. A grid power limit 508 (PwrLimGDPL) during recovery from the grid fault is determined as a function of a voltage feedback 506, a phase locked loop (PLL) error signal, or similar method. The grid power limit 508 is used to limit the power reference signal 504 and generate a target grid power requirement 510 (PGridTarg) for the recovery.

Figure 10:
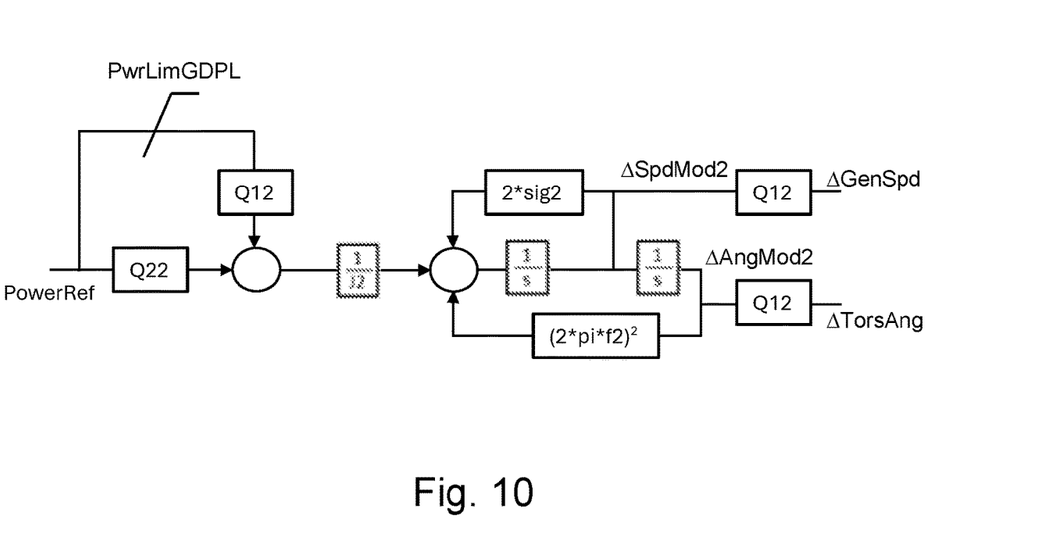
FIG. 10 is a schematic diagram of a model that estimates the speed and angle of the main drivetrain torsional mode of oscillation.

The power reference signal 504 and grid power limit 508 are provided to a drivetrain model 512. This model 512 estimates the speed and angle of the main drivetrain torsional mode of oscillation (typically at ~1 Hz for WTGs with gearboxes). This model may be implemented as a simple second order model with parameters for Inertia and Damping that are fit to approximate the dynamics of the turbine. The output of the model is the torsional angle ($\theta t$-$\theta g$) discussed above. An example of this type of model is shown FIG. 10 In this model, the parameters J2, sig2, and f2 represent the inertia, damping, and torsional mode frequency of the drivetrain. The constants Q12 and Q22 reflect scaling factors based on the participation of a particular component in the torsional mode. The outputs of the model are the change in torsional angle $\Delta$TorsAng and change in speed $\Delta$GenSpd.

The torsional angle ($\theta t$-$\theta g$) is communicated to the torsional angle compensator 514, which is configured to monitor the torque angle ($\theta t$-$\theta g$) and adjust the drivetrain power with certain timing to mitigate large torque angle peaks generated during the grid fault or the recovery, as discussed above with respect to FIGS. 7a-7c. For example, the compensator 514 may monitor for an increase of the torque angle ($\theta t$-$\theta g$) above a threshold value, which may include an increase following a torque reversal (depicted in FIGS. 6b and 7b discussed above), at which point the torsional angle compensator 514 generates a torsional power adjustment command 516 (Ptors). This command 516 is applied to the target grid power requirement 510 at the junction 518, thereby generating a reduced target drivetrain power command 520 (PdrvTarg). In other embodiments, the reduced target drivetrain power command may be based on a speed (or change in speed) signal instead of a torsional angle command.

The target drivetrain power command 520 is provided to a downstream rotor regulator 522 to decrease the generator electrical torque (Te) with the timing discussed above with respect to FIG. 7a during the grid fault. The power command on the generator may be decreased in proportion to a rate of change of the torque angle ($\theta t$-$\theta g$) following the torque reversal. In other embodiments, the power command on the generator may be temporarily frozen, or alternatively, increased at a slower pace than the target grid power. This freezing or slower power recovery may continue until either the torsional angle starts to decrease or the speed starts to increase.

The target grid power requirement 510 is compared to the target drivetrain power command 520 at the junction 524 to generate an energy storage power command 526 (PesCmd) transmitted to a controller 530 (e.g., the controller 242 in FIG. 2) configured with the energy storage device (e.g., the battery or ultracapacitor 240 in FIG. 2). This command 526 causes an amount of power (i.e., make-up power) corresponding to the difference between the target grid power requirement 510 and the target drivetrain power 520 to be supplied from the energy storage device to the grid to satisfy the target grid power requirement. In the embodiment depicted in FIG. 2, the make-up power is supplied from the energy storage device 240 to the power converter 220. In some embodiments, a bi-directional DC-DC converter may be present to facilitate bidirectional exchange of power from the DC bus of the converter to the energy storage. The control command for the energy storage is then used to operate the switching of the DC-DC converter in such a way to achieve the desired power flow. The power supplied from the energy storage device may be increased in proportion to a rate of change of the torque angle following the torque reversal.

As discussed above with respect to FIG. 7a, the power command on the generator (target drivetrain power command 520) may be increased to the target grid power requirement 510 when a phase of the torsional angle is decreasing during recovery from the grid event or when the speed begins increasing.

Figure 9:
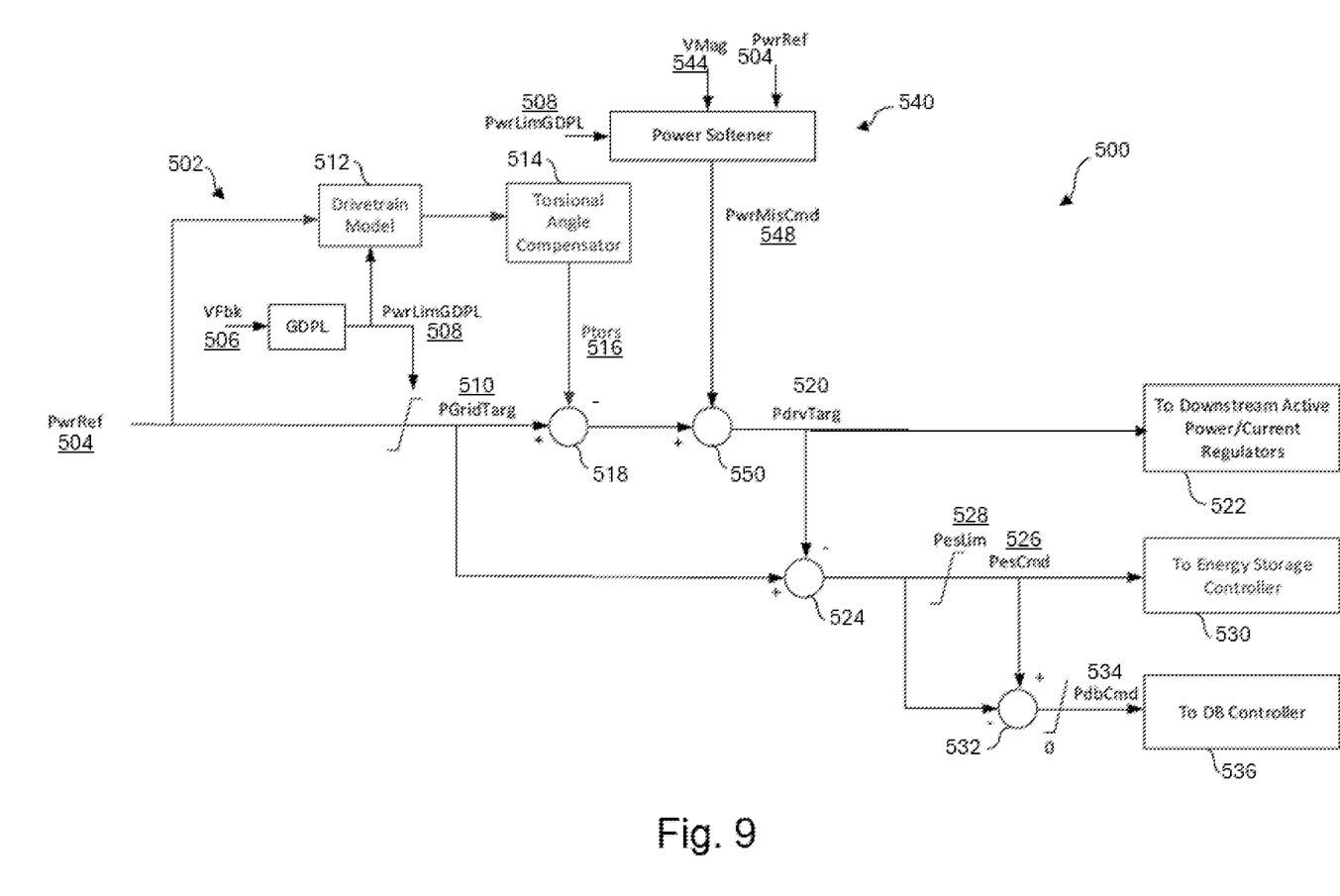
FIG. 9 is a schematic diagram of control of the power generating asset with integration of a first and second power softening functions according to the present disclosure.

FIG. 9 depicts an embodiment of the method 500 that includes a second power softening function 540 that may be implemented when the torsional angle ($\theta t-\theta g$) does not exceed the threshold value discussed above, such as during a grid event and before recovery from the grid event. The second power softening function 504 operates on the principle of increasing the power command of the generator during the grid event above the grid power limit to avoid large changes in power of the generator, thereby reducing a likelihood of coupling slips of the drivetrain. The excess power generated by the generator during the grid event is diverted to the energy storage device or is dissipated, thereby maintaining a net power generated by the power generating asset at the target grid power requirement 510.

The second power softening function 540 is described in detail in the commonly owned PCT International Application No. PCT/US2022/044672 filed on Sep. 22, 2022, which is incorporated herein by reference in its entirety for all purposes.

In general, the second power softening function 540 includes a plurality of inputs, including the power reference 504 (PwrRef) and a local turbine voltage feedback signal 544 (VMag). The function 540 determines an error signal by comparing the power reference signal 504 to the grid power limit 508. The local voltage feedback signal is combined with a known current limit of the converter to create a dynamic power limit. The error signal is processed to generate a power command 548 (PwrMisCmd) that is limited by this dynamic power limit and summed with the target grid power requirement 510 (which is not decreased by the torsional angle compensator 514 at this point in time in this scenario) at junction 550 to generate the target drivetrain power command 520, which in this scenario is greater than the target grid power requirement 510 and is forwarded to the regulator 522. The generator thus produces power in excess of the target grid power requirement 510.

Processing of the error signal may include comparing the error signal to an offset, limiting the error signal by applying a lower limit to the error signal 512, and/or filtering the error signal via a filter, such as a low pass filter. In such embodiments, for example, the offset together with the lower limit may assist with activating the second power softening function 540 for more or less severe grid faults and for maintaining the second power softening function 540 inactive during normal operating conditions.

The difference (excess power) between the target grid power requirement 510 and the target drivetrain power command 520 is determined at junction 524 and may be limited by an energy storage power limit 528 to generate an energy storage power command 526 (PesCmd) that is transmitted to the energy storage controller 530, resulting in the excess energy produced by the generator being diverted to the energy storage device (at least up to the level of the energy storage power command 526).

Any of the excess generator power limited by the limiter 528 is determined at the junction 532 to generate a power dissipate command. In this embodiment, the power dissipate command is a dynamic brake power command 534 (PdbCmd), which results in the excess generator power being dissipated via the dynamic brake 238 in FIG. 2.

The charging rate of the energy storage device may also be limited by the limiter 528 (or another limiting function), wherein to decrease the charging rate to below a maximum value, the excess generator power determined at the junction 532 is dissipated via the dynamic brake.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Further aspects of the invention are provided by the subject matter of the following clauses:

Clause 1: A method for controlling a power generating asset connected to an electrical grid, the power generating asset having a power converter and a drivetrain connected to a generator, the method comprising: receiving, via a controller, a grid power limit associated with a grid event occurring in the electrical grid; based on the grid power limit, determining a target grid power for the generator during recovery from the grid event; during the recovery from the grid event, implementing, via the controller, a first power softening function, the first power softening function comprising: receiving at least one of a torsional angle signal or change in speed signal associated with the drivetrain; upon at least one of the torsional angle or change in speed crossing a threshold value, decreasing a power command on the generator below the target grid power to reduce the torsional angle at a later point in time; determining a power difference between the target grid power and the decreased power command of the generator; and supplying power from an energy storage device in communication with the converter to make up the power difference.

Clause 2: The method of clause 1, wherein the threshold value reflects a torsional angle indicative of a torque reversal between two or more components on the drivetrain.

Clause 3: The of method of any preceding clause, wherein the power command on the generator is decreased in proportion to a rate of change of the torsional angle following the torque reversal, and wherein the power supplied from the energy storage device is increased based on the difference between the target grid power and the reduced power command on the generator so that the total power injected into the grid follows the target grid power.

Clause 4: The of method of any preceding clause, wherein the threshold value reflects a change in speed indicative of a decreasing speed associated with the drivetrain.

Clause 5: The of method of any preceding clause, wherein the threshold value reflects a change in speed indicative of a decreasing speed associated with the drivetrain.

Clause 6: The of method of any preceding clause, further comprising increasing the power command on the generator toward the target grid power when a phase of the torsional angle is decreasing or the speed is increasing during recovery from the grid event.

Clause 7: The of method of any preceding clause, further comprising implementing, via the controller, a second power softening function during the grid event but before the recovery from grid event, the second power softening function comprising: increasing the power command on the generator to above the target grid power during the grid event; and diverting excess power generated by the generator above the target grid power requirement to the energy storage device.

Clause 8: The of method of any preceding clause, wherein once the energy storage device is charged or a charging rate limit on the energy storage device is reached, the excess power generated by the generator is dissipated via a dynamic brake in the power converter.

Clause 9: The of method of any preceding clause, further comprising computing the grid power limit as a function of at least one of a voltage feedback or a phase locked loop (PLL) error signal.

Clause 10: The of method of any preceding clause, wherein the power generating asset is a wind turbine.

Clause 11: The of method of any preceding clause, wherein the energy storage device is one or both of a battery and an ultracapacitor.

Clause 12: The of method of any preceding clause, wherein the grid event comprises one of a low-voltage ride through event (LVRT) or a zero-voltage ride through (ZVRT) event.

Clause 13: A power generating asset connected to an electrical grid, the power generating asset comprising: a generator; a power converter coupled to the generator; and a controller comprising at least one processor configured to perform a plurality of operations, the plurality of operations including: receiving a grid power limit associated with a grid event occurring in the electrical grid; based on the grid power limit, determining a target grid power for the generator during recovery from the grid event; during the grid event, implementing a first power softening function, the first power softening function including: receiving at least one of a torsional angle signal or change in speed signal associated with the drivetrain; upon at least one of the torsional angle or change in speed crossing a threshold value, decreasing a power command on the generator below the target grid power to reduce the torsional angle at a later point in time; determining a power difference between the target grid power and the decreased power command of the generator; and supplying power from an energy storage device in communication with the converter to make up the power difference.

Clause 14: The power generating asset of clause 13, wherein the first power softening function includes decreasing the power command on the generator in proportion to a rate of change of the torsional angle following the torque reversal, and wherein the power supplied from the energy storage device is increased based on the difference between the target grid power and the reduced power command on the generator so that the total power injected into the grid follows the target grid power.

Clause 15: The power generating asset of any preceding clause, wherein the threshold value reflects a change in speed indicative of a decreasing speed associated with the drivetrain and the first power softening function includes temporarily freezing or increasing the power command on the generator at a slower rate than the target grid power following the indication of a decreasing speed associated with the drivetrain.

Clause 16: The power generating asset of any preceding clause, wherein the first power softening function includes increasing the power command on the generator toward the target grid power when a phase of the torsional angle is decreasing or the speed is increasing during recovery from the grid event.

Clause 17: The power generating asset of any preceding clause, wherein the controller is further configured to implement a second power softening function during recovery from the grid event but before the recovery from grid event, the second power softening function including: increasing the power command on the generator to above the target grid power during the grid event; and diverting excess power generated by the generator above the target grid power requirement to the energy storage device.

Clause 18: The power generating asset of any preceding clause, wherein once the energy storage device is charged, the controller is configured to dissipate the excess power generated by the generator via a dynamic brake in the power converter.

Clause 19: The power generating asset of any preceding clause, wherein once a charging rate limit on the energy storage device is reached, the controller is configured to dissipate remaining excess power generated by the generator via a dynamic brake in the power converter.

Clause 20: The power generating asset of any preceding clause, wherein the power generating asset is a wind turbine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a power generating asset connected to an electrical grid, the power generating asset having a power converter and a drivetrain connected to a generator, the method comprising:
  receiving, via a controller, a grid power limit associated with a grid event occurring in the electrical grid;
  based on the grid power limit, determining a target grid power for the generator during recovery from the grid event;
  during the recovery from the grid event, implementing, via the controller, a first power softening function, the first power softening function comprising:
    receiving at least one of a torsional angle signal or change in speed signal associated with the drivetrain;
    upon at least one of the torsional angle or change in speed crossing a threshold value, decreasing a power command on the generator below the target grid power to reduce the torsional angle at a later point in time;

determining a power difference between the target grid power and the decreased power command of the generator; and supplying power from an energy storage device in communication with the converter to make up the power difference.

2. The method of claim 1, wherein the threshold value reflects a torsional angle indicative of a torque reversal between two or more components on the drivetrain.

3. The method of claim 2, wherein the power command on the generator is decreased in proportion to a rate of change of the torsional angle following the torque reversal, and wherein the power supplied from the energy storage device is increased based on the difference between the target grid power and the reduced power command on the generator so that the total power injected into the grid follows the target grid power.

4. The method of claim 1, wherein the threshold value reflects a change in speed indicative of a decreasing speed associated with the drivetrain.

5. The method of claim 4, wherein the power command on the generator is temporarily frozen or increased at a slower rate than the target grid power following the indication of a decreasing speed associated with the drivetrain.

6. The method of claim 1, further comprising increasing the power command on the generator toward the target grid power when a phase of the torsional angle is decreasing or the speed is increasing during recovery from the grid event.

7. The method of claim 1, further comprising implementing, via the controller, a second power softening function during the grid event but before the recovery from grid event, the second power softening function comprising:

increasing the power command on the generator to above the target grid power during the grid event; and diverting excess power generated by the generator above the target grid power requirement to the energy storage device.

8. The method of claim 7, wherein once the energy storage device is charged or a charging rate limit on the energy storage device is reached, the excess power generated by the generator is dissipated via a dynamic brake in the power converter.

9. The method of claim 1, further comprising computing the grid power limit as a function of at least one of a voltage feedback or a phase locked loop (PLL) error signal.

10. The method of claim 1, wherein the power generating asset is a wind turbine.

11. The method of claim 1, wherein the energy storage device is one or both of a battery and an ultracapacitor.

12. The method of claim 1, wherein the grid event comprises one of a low-voltage ride through event (LVRT) or a zero-voltage ride through (ZVRT) event.

13. A power generating asset connected to an electrical grid, the power generating asset comprising:

a generator;

a power converter coupled to the generator; and a controller comprising at least one processor configured to perform a plurality of operations, the plurality of operations comprising:

receiving a grid power limit associated with a grid event occurring in the electrical grid;

based on the grid power limit, determining a target grid power for the generator during recovery from the grid event;

during the grid event, implementing a first power softening function, the first power softening function comprising:

receiving at least one of a torsional angle signal or change in speed signal associated with the drivetrain;

upon at least one of the torsional angle or change in speed crossing a threshold value, decreasing a power command on the generator below the target grid power to reduce the torsional angle at a later point in time;

determining a power difference between the target grid power and the decreased power command of the generator; and supplying power from an energy storage device in communication with the converter to make up the power difference.

14. The power generating asset of claim 13, wherein the first power softening function includes decreasing the power command on the generator in proportion to a rate of change of the torsional angle following the torque reversal, and wherein the power supplied from the energy storage device is increased based on the difference between the target grid power and the reduced power command on the generator so that the total power injected into the grid follows the target grid power.

15. The power generating asset of claim 14, wherein the threshold value reflects a change in speed indicative of a decreasing speed associated with the drivetrain and the first power softening function includes temporarily freezing or increasing the power command on the generator at a slower rate than the target grid power following the indication of a decreasing speed associated with the drivetrain.

16. The power generating asset of claim 13, wherein the first power softening function includes increasing the power command on the generator toward the target grid power when a phase of the torsional angle is decreasing or the speed is increasing during recovery from the grid event.

17. The power generating asset of claim 13, wherein the controller is further configured to implement a second power softening function during recovery from the grid event but before the recovery from grid event, the second power softening function comprising:

increasing the power command on the generator to above the target grid power during the grid event; and diverting excess power generated by the generator above the target grid power requirement to the energy storage device.

18. The power generating asset of claim 17, wherein once the energy storage device is charged, the controller is configured to dissipate the excess power generated by the generator via a dynamic brake in the power converter.

19. The power generating asset of claim 17, wherein once a charging rate limit on the energy storage device is reached, the controller is configured to dissipate remaining excess power generated by the generator via a dynamic brake in the power converter.

20. The power generating asset of claim 13, wherein the power generating asset is a wind turbine.

* * * * *